United States Patent
Russell et al.

(10) Patent No.: US 9,950,473 B2
(45) Date of Patent: Apr. 24, 2018

(54) CONSECUTIVE PIECEWISE MOLDING SYSTEM AND METHOD

(71) Applicant: Option 3 Solutions, Inc., La Crescenta, CA (US)

(72) Inventors: Richard J. Russell, La Crescenta, CA (US); Michael F. Turk, Porter Ranch, CA (US)

( * ) Notice: Subject to any disclaimer, the term of this patent is extended or adjusted under 35 U.S.C. 154(b) by 383 days.

(21) Appl. No.: 14/510,194

(22) Filed: Oct. 9, 2014

(65) Prior Publication Data

US 2015/0102523 A1 Apr. 16, 2015

Related U.S. Application Data

(60) Provisional application No. 61/889,443, filed on Oct. 10, 2013.

(51) Int. Cl.

| | | |
|---|---|---|
| B29C 45/14 | (2006.01) | |
| B29C 67/00 | (2017.01) | |
| B22D 17/00 | (2006.01) | |
| B22D 25/00 | (2006.01) | |
| B29C 39/02 | (2006.01) | |
| B28B 1/24 | (2006.01) | |
| B28B 1/00 | (2006.01) | |
| B28B 7/00 | (2006.01) | |
| B33Y 10/00 | (2015.01) | |
| B29C 64/106 | (2017.01) | |
| B22D 19/00 | (2006.01) | |

(52) U.S. Cl.
CPC .......... *B29C 67/0055* (2013.01); *B22D 17/00* (2013.01); *B22D 25/00* (2013.01); *B28B 1/001* (2013.01); *B28B 1/24* (2013.01); *B28B 7/0091* (2013.01); *B29C 39/021* (2013.01); *B29C 45/14* (2013.01); *B29C 64/106* (2017.08); *B33Y 10/00* (2014.12); *B22D 19/00* (2013.01)

(58) Field of Classification Search
None
See application file for complete search history.

(56) References Cited

U.S. PATENT DOCUMENTS

| | | | | |
|---|---|---|---|---|
| 3,192,298 A | * | 6/1965 | Fisher | B29C 45/0003 264/167 |
| 3,608,034 A | * | 9/1971 | Bramley | A01K 3/005 264/145 |
| 3,689,612 A | * | 9/1972 | Jun Taga | B29C 44/30 264/167 |
| 4,466,692 A | * | 8/1984 | Sonoda | H05K 13/003 206/717 |
| 4,686,766 A | * | 8/1987 | Dubbs | B29C 45/0003 264/165 |

(Continued)

FOREIGN PATENT DOCUMENTS

JP 55097940 * 7/1980

*Primary Examiner* — Edmund Lee

(57) ABSTRACT

The present invention is directed to a method for additively fabricating a solid object from a series of components. The method utilizes additive fabrication with a programmed computer operating a machine to produce a solid object based on a three dimensional, computerized rendering of the solid object. Each component is produced from one or more molds which are filled with a fluid material that solidifies into a component that attaches to a previously manufactured component by way of the same process.

8 Claims, 8 Drawing Sheets

(56) References Cited

U.S. PATENT DOCUMENTS

| | | | | |
|---|---|---|---|---|
| 5,484,564 A | * | 1/1996 | Goto | B29C 43/14 |
| | | | | 264/219 |
| 5,830,012 A | * | 11/1998 | Ortega | B29C 45/0003 |
| | | | | 206/722 |
| 8,557,160 B2 | * | 10/2013 | O'Connor | B29C 43/28 |
| | | | | 264/241 |
| 2014/0239544 A1 | * | 8/2014 | Franksson | B29C 45/162 |
| | | | | 264/255 |

* cited by examiner

CONSECUTIVE PIECEWISE MOLDING SYSTEM AND METHOD

CROSS REFERENCE TO RELATED APPLICATION(S)

This application claims the benefit of U.S. Provisional Application No. 61/889,443, filed Oct. 10, 2013.

FIELD OF THE INVENTION

The present invention relates in general to automated injection molding and in particular to a method for additively fabricating a solid object.

BACKGROUND OF THE INVENTION

Additive fabrication, rapid prototyping and desktop manufacturing are terms used to describe a relatively new type of manufacturing whereby a solid object is produced, typically in layers, by adding material to previously deposited (or solidified or cured) materials. The solid object is usually fabricated by first segmenting a computer solid model of an object into sub-pieces or layers. These layers of the virtual model are then fabricated by a machine, layer by layer, to a solid representation of the virtual object.

Each method has unique challenges and opportunities. One challenge for all of the methods is the limited number and type of materials from which they can fabricate a solid object. A second challenge for most of the methods is that they also suffer from a weakened strength of the piecewise fabricated object, as compared to an object made by more traditional manufacturing methods (such as molding, machining or casting). Each method also has limitations for the speed with which they can fabricate a solid object. The very nature of fabricating a solid object, layer by layer, results in a relatively slow speed for making the solid object when compared to more traditional manufacturing methods such as molding and casting.

There exists a need in the art for a method that can work with a wide variety of materials, including those with composite fillers such as glass. There further exists a need in the art for an enclosed injection mold cavity that allows for the use of pressure while molding so as to produce objects with superior strength to other additive fabrication techniques. Lastly, there exists a need in the art for molds of various sizes, thereby permitting fast object fabrication.

SUMMARY OF THE INVENTION

According to the present invention, the foregoing and other objects and advantages are obtained by using a programmed computer operating a machine to additively produce a solid object from a three dimensional rendering of the solid object comprising the steps of: (1) positioning a first mold in a first predetermined position against a support; (2) filling the inside volume of the first mold with a first volume of fluid material; (3) permitting the fluid material to solidify into a first component; (4) removing the first mold from the first predetermined position; (5) positioning a second mold in a second predetermined position abutting the first component; (6) filling the inside volume of the second mold with a second volume of fluid material; (7) permitting the second fluid material to solidify into a second component; (8) removing the second mold from the second predetermined position; (9) positioning a subsequent mold in a subsequent predetermined position that abuts one or more previously formed components; (10) filling the inside volume of the subsequent mold with a subsequent volume of fluid material; (11) permitting the subsequent volume of fluid material to solidify into a subsequent component; (12) removing the subsequent mold from the subsequent predetermined position; and (13) repeating steps 9 through 12 until all components of the solid object are formed.

According to another embodiment of the invention, one or more of the said molds are identical. 3. According to another embodiment of the invention, one or more of the said molds are of a different size and/or shape. According to another embodiment of the invention, the steps of filling each of the said molds with a fluid material is accomplished with a pressurized injection of the fluid material into each of the said molds. According to another embodiment of the invention, one or more of the said molds include one or more mechanical interlock. According to another embodiment of the invention, the mechanical interlock comprise a screw thread, pins or protrusions. According to another embodiment of the invention, one or more of the said molds include one or more inserts. According to another embodiment of the invention, the inserts comprise screws or pins. According to another embodiment of the invention, the fluid material comprises metal, a thermoplastic, a thermoplastic composite, thermoset, a thermoset composite, or ceramic. According to another embodiment of the invention, the abutting components are bounded together by cohesion or adhesion. According to another embodiment of the invention, the step of utilizing an auxiliary nozzle to heat solidified components and/or cool injected fluid material in order to accelerate solidification is added.

BRIEF DESCRIPTION OF THE DRAWINGS

The invention will become more readily apparent from the following description of preferred embodiments thereof shown, by way of example only, in the accompanying drawings wherein.

DETAILED DESCRIPTION OF THE INVENTION

The present invention relates to a method for additively fabricating a solid object. The method consists of additively molding portions of a solid object in a consecutive manner. An enclosed volume, or cavity, is filled with a liquid material that solidifies. The cavity is defined either by a pre-fabricated mold, or by a pre-fabricated mold in contact with previously molded segments of the final object being fabricated. The fluid material then solidifies inside the enclosed volume, to additively create an object. The molds are automatically changed and define one or more of the surfaces of the object being molded. After a segment is molded, a mold is moved to a space next to a previously molded segment and another segment is molded. The previously molded segments serve as the other surfaces of the enclosed volume for the subsequent section being molded, and the newly molded section mates to the prior molded section.

The fluid material can be a thermoplastic material, a glass or mineral filled thermoplastic material, a thermosetting resin, a glass or mineral filled thermosetting resin, a thermoplastic filled with metallic particles such as used in metal injection molding, and or a liquid metal material such as is used in sand casting or die casting.

This method is an additive method of manufacturing based on molds attached to a machine that can dispense fluid into the mold cavity. The fluid then solidifies within the mold cavity to create a segment of a larger solid object. The fluid can be either gravity fed or supplied under pressure such as is typical in a standard injection molding machine.

In this method a variety of molds are used to mold the small segments of the larger solid object. Molds of varying size and shape are used for additively fabricating the larger object. In this method, the molds contact against the previously solidified segments such that the newly added fluid in the mold cavity adheres to the previously molded segment. The molds can also be in contact with an insert, such as is done in insert injection molding, to fabricate objects with unique features.

If desired, this method can also be used with the fluid inside the mold being under pressure. Such pressurized molding, such as in injection molding, can create objects with superior strength to other types of additive fabrication methods.

Figure 1:
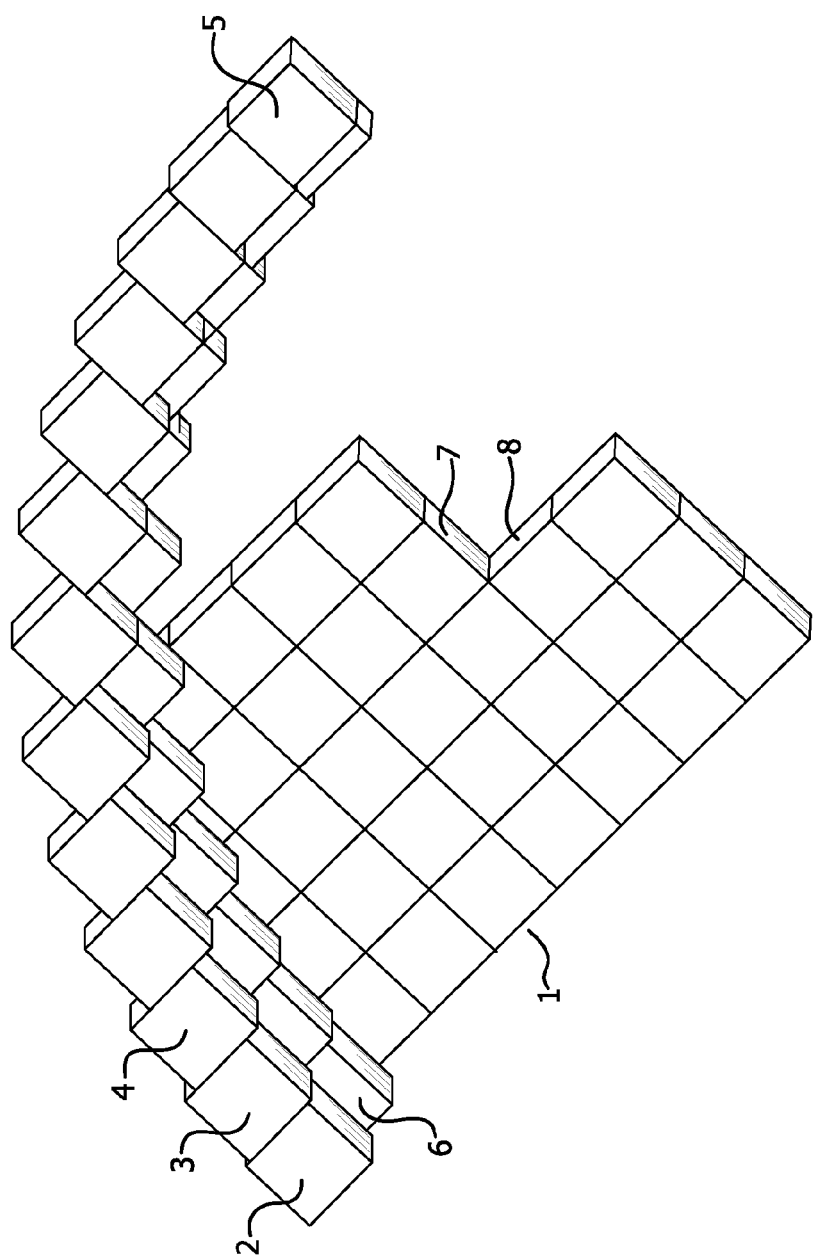
FIG. 1 is a perspective view of an object in the process of being fabricated according to one aspect of the instant invention.

Because the dispensing of the fluid is into a mold, a relatively large nozzle can be used for the dispensing method allowing the process to utilize fluid like materials containing filler materials (such as glass or minerals or metal powders). FIG. 1 shows a bottom view of a partial object 1 that is being fabricated using this method. Fabrication begins by molding a first block 2 onto a suitable support (not shown). Blocks are used in this disclosure as a simplified explanation of the method. The block 2, shown as a cube, can be any suitable geometry, simple or complex, as desired to build the end object. The support that the first block 2 is molded onto can be a surface of any material that the first block 2 will at least partially adhere to, enough to keep the object 1 supported for continued fabrication with the additive method disclosed here within. Supports can also be a make-up of mechanical means, such as small pins, screws or clamps that the block molds directly over, around, or adjacent enough to create a support, preventing motion in one or more degrees of freedom. Alternately this support can be another object made by the method disclosed here within, or another manufacturing method, in which the desire is to add to that object.

The next step in fabrication is to mold the 2nd block 3, then the 3rd block 4 in a consecutive piece-wise manner. The process of adding blocks continues consecutively on the same plane in this example, up to the 13th block 5. Another layer is then started with the addition of another block 6 placed above the first block 2. Fabrication does not need to occur layer by layer, and alternatively can consist of any arrangement, or order of molding that is suitable to fabricating the desired object.

Each individual block is molded by creating an enclosure, injecting a liquefied material (possibly under pressure) into said enclosure, and holding the enclosure generally in place while the material solidifies, solidifying at least enough to start the fabrication of the next block. The enclosure is generally held in place as needed to help the solidification process of the material, and can be held under pressure during cooling to increase part strength. This pressure, typically referred to as packing pressure in the injection molding industry can be created by pressure through the nozzle injecting the liquefied material as done in injection molding industry, through small movements in one or more of the enclosure walls, or a combination of these to create desired pressure. The enclosures are formed as required for molding each additive piece.

Figure 2:
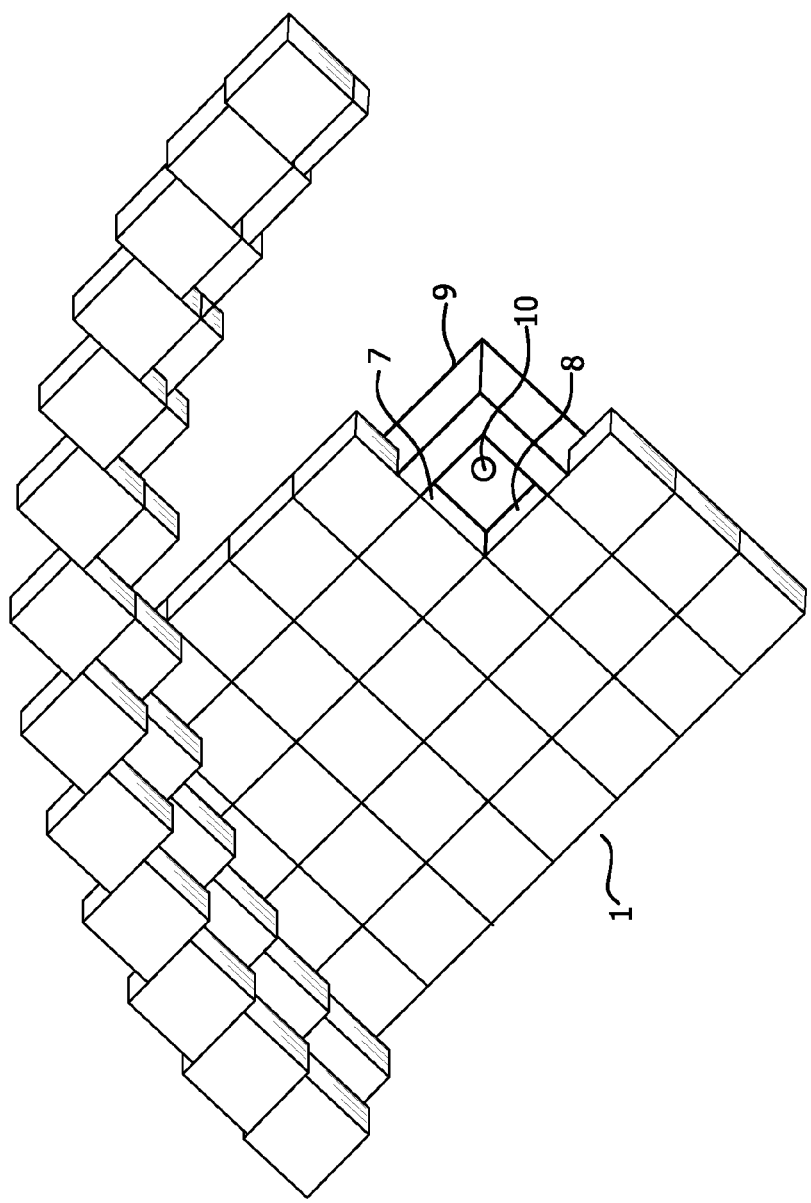
FIG. 2 is a perspective view of an object in the process of being fabricated according to one aspect of the instant invention, along with a mold in place that will be used to add the next piece to the object.

In FIG. 1, the surfaces 7 and 8 of object 1 will form two of the six sides of the enclosure used to mold the next block onto the object 1. FIG. 2 shows a small mold 9 that will be used to form three more sides of the enclosure. This mold 9 can be made of any material, but will typically be either steel, aluminum or ceramic. The mold is put and held into place by computer controlled machinery, which creates the relative motion required to place the mold 9 onto the appropriate place on the object 1. The machinery will hold the mold 9 or move the mold 9, as required, during the molding process. Generally, this machinery is computer controlled with appropriate machine commands determined by software that interprets a 3D computer model of the object being created. The mold 9 can be one of a plethora of molds, pre-fabricated, to be selected by machinery when needed, to form a desired enclosure, as dictated by geometry of the object being fabricated. The features of mold 9 can be part of a plate, wheel or strip with a plethora of shapes that are either, attached to, machined into, or carried by said plate, wheel or strip, in order to form one or more surfaces of a desired enclosure.

Figure 3:
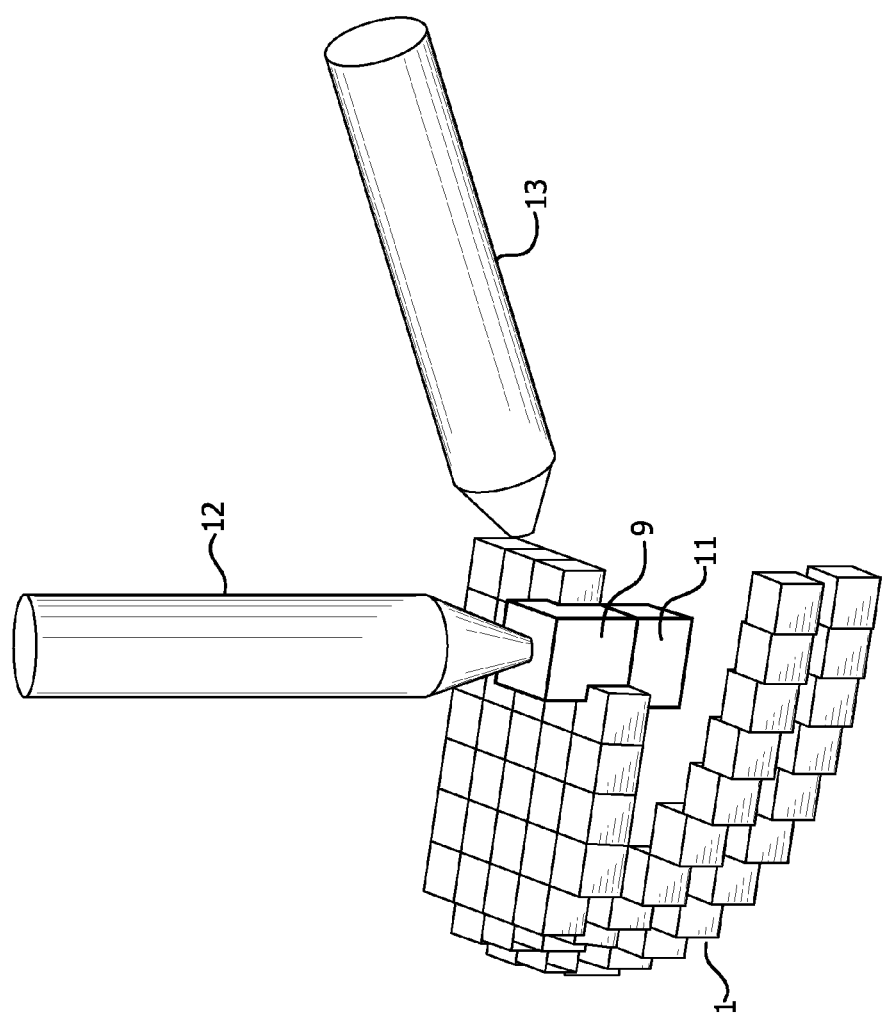
FIG. 3 is a perspective view of an object in the process of being fabricated according to one aspect of the instant invention, with the molds in place to create a complete the enclosure used to mold the next segment.
Figure 4:
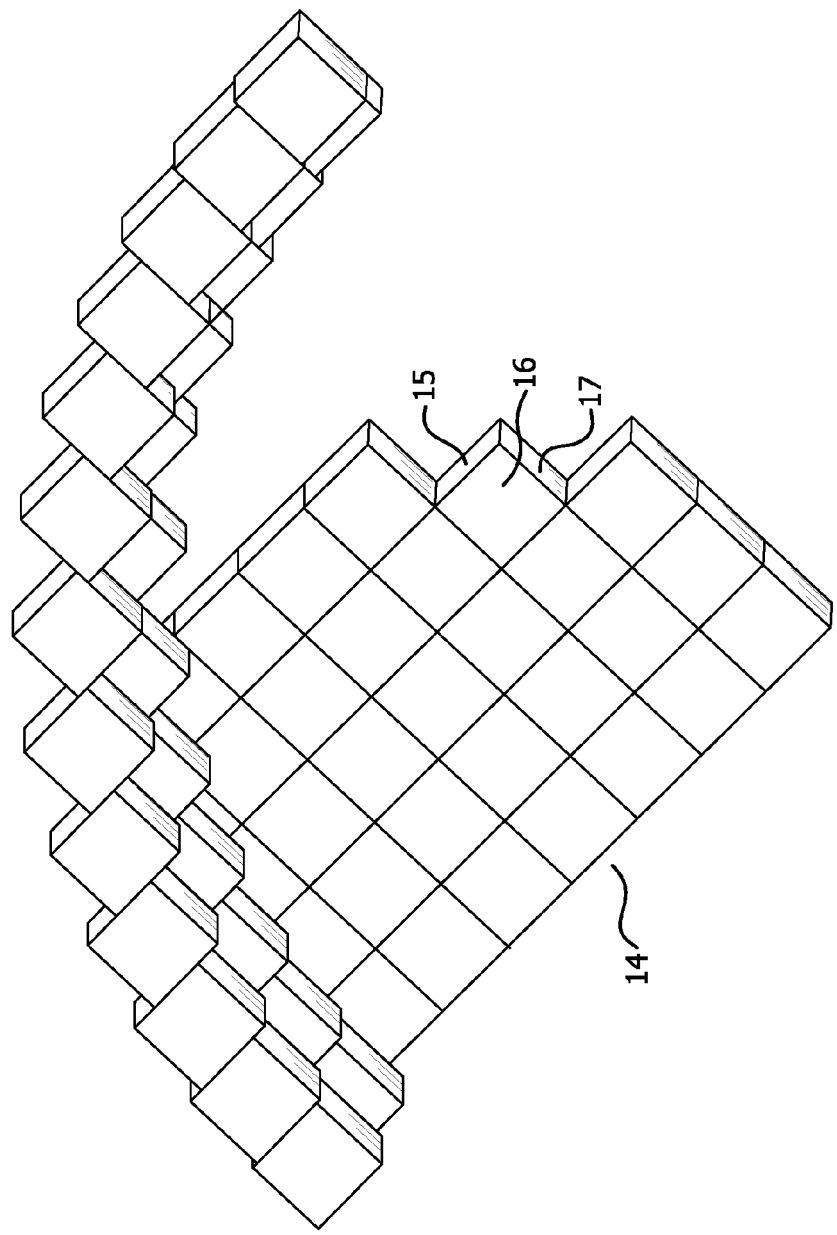
FIG. 4 is a perspective view of the object depicted in FIG. 1 with a new piece added the process.

FIG. 3, shows the final surface of the enclosure created by an additional mold 11. This mold is moved into place by machinery in generally the same manner as mold 9 above. With the enclosure in place, molding of the block begins with injection of the liquefied material from the nozzle 12 thru the hole 10 in FIG. 2. The nozzle 12 can be of construction typically seen in smaller injection molding machines, and include a hot-tip or valve gated hot runner often used in the injection molding industry. This nozzle can also be a funnel in which liquid material is injected merely using gravity. For thermoplastic materials, when the liquefied material enters the enclosure, the melt front is hot enough to melt a portion of the previously molded material to create a cohesive bond. After injection occurs, the molds are held in place until sufficient solidification has occurred to continue to the next block. If desired, pressure can be used during solidification to increase bond strength. After enough cooling has occurred the molds 9 and 11 as well as the nozzle, retract and are ready to mold the next block per the computer commands. In this manner, one embodiment of the instant invention utilizes a plurality of molds simultaneously. According to that embodiment, groups of molds can be utilized in all of the steps herein mentioned in lieu of using a single mold at a time to iterate through the construction of an object. FIG. 4 shows the object 14 which is the original object 1 with the new block 16 in place. New block 16 has side 15 and side 17.

FIG. 3 also shows an auxiliary nozzle 13, and one or more can be used with this method. The auxiliary nozzle 13 provides heat or cold, or individual nozzles are used for each separately (not depicted). Heat is used to pre-heat already existing plastic to improve cohesion. The heat can be used to heat solidified material at the tip of the nozzle 13 before injecting as well. The heat can also be used to heat the mold wall to promote material flow for a thermoplastic or metal material. The heat can also aid cross-linking in a thermo-setting plastic material. Cold can be used to quickly solidify a thermoplastic or metal material that may leak out of the enclosure, due to imperfect fit between molds and the part or through intentional air venting channels. The cold can also be used to help more quickly solidify the thermoplastic or metal material in the enclosure in order to decrease the overall time it takes to create an object.

Figure 5:
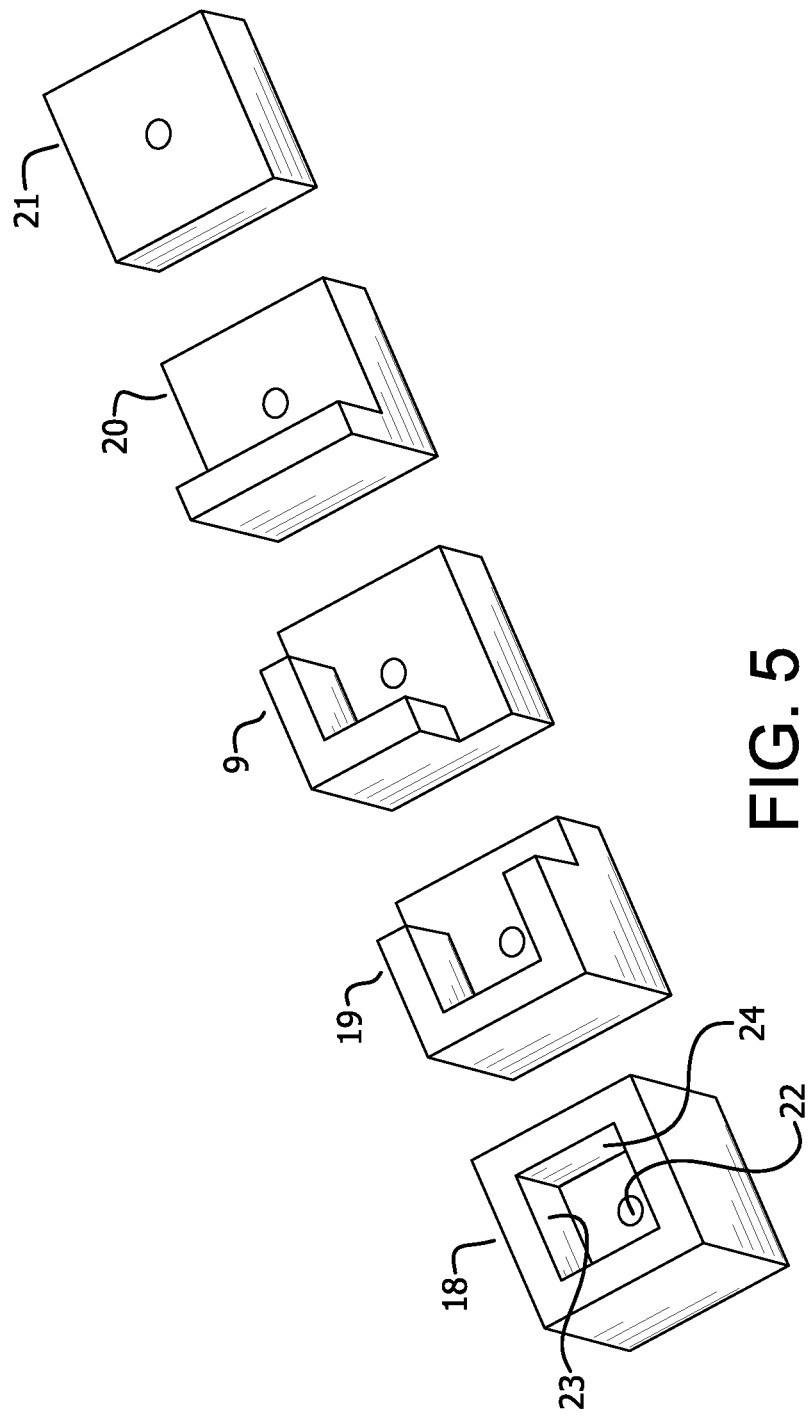
FIG. 5 is a perspective view of multiple molds that are used according to one embodiment of the instant invention.

FIG. 5 shows several molds that can be used to create an object. Mold 18 is one where the mold itself creates five surfaces of a cube. In this case the open face of the mold 18 is pressed against a previously molded surface, or to a suitable support surface as described in FIG. 1, to create a standing cube. The hole 22 in the mold 18 allows the mating of a nozzle for inserting the liquid into the mold. Mold 19 is a mold where the wall 24 of mold 18 has been removed and hence forms four surfaces of a cube. Mold 9 shown here in FIG. 5 was used above to describe the process and is shown in other figures as well. Mold 20 is a mold that only forms two walls of a cube. Mold 21 is a mold that would only serve as one surface. The rest of the surfaces would be made from previously molded pieces, or from other molds such as mold 11 in FIG. 3.

Figure 6:
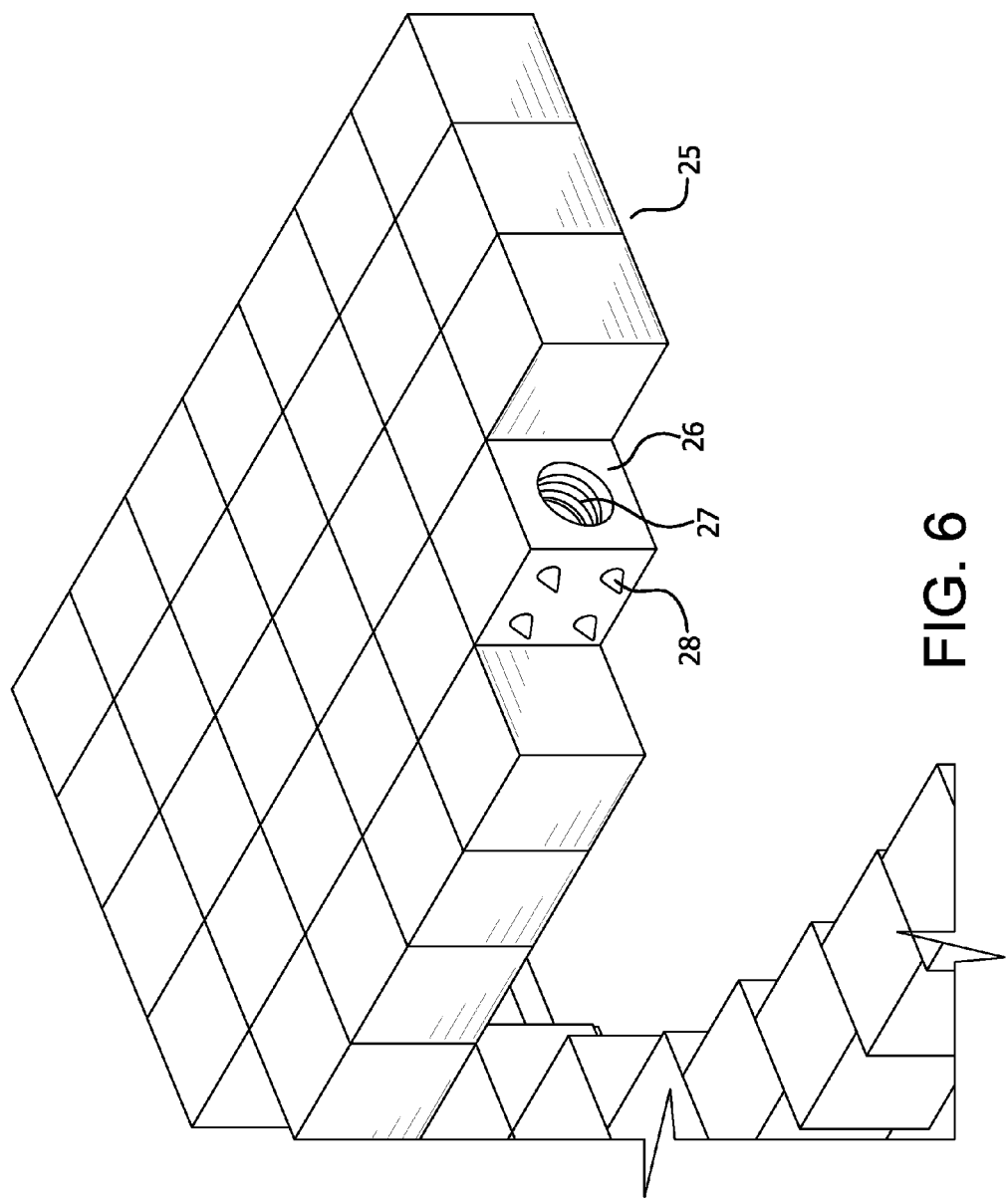
FIG. 6 is a perspective view of an object with mechanical interlock features molded into a segment according to one embodiment of the instant invention.
Figure 7:
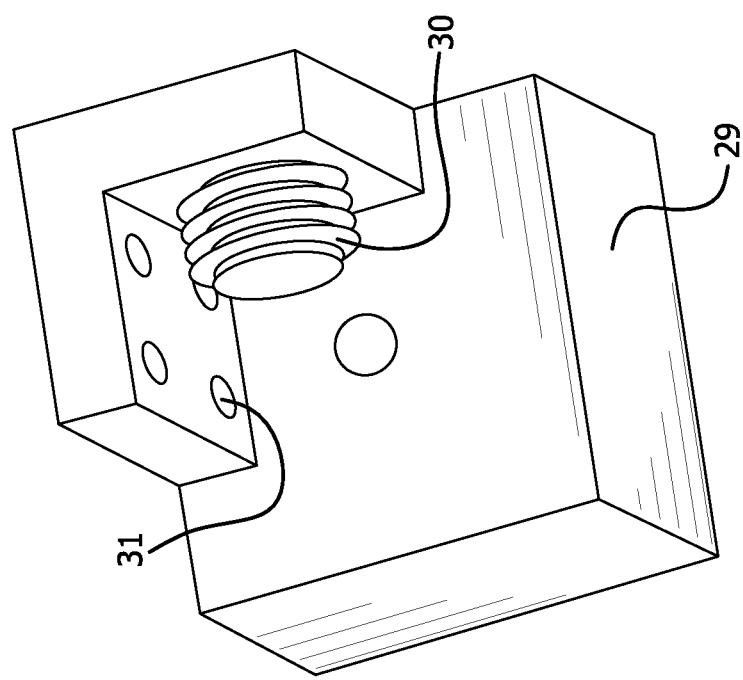
FIG. 7 is a perspective view of a mold with features to create mechanical interlocks in a molded segment according to one embodiment of the instant invention.

As mentioned above, this technique relies on cohesive bonds of injected material with previously molded pieces. To increase strength, mechanical interlocking features can be utilized. This is particularly useful for composite or filled materials, or materials with long molecular chains due to increased overlap and meshing. FIG. 6 shows an object 25 with a block 26 that has mechanical interlock features molded into it. Shown are a screw thread 27, and protrusions 28. Beside actual mechanical interlocking, there is more surface area in which to cohesive bond. As far as mechanical interlocking, one can picture many of these features molded into different cubes. If done properly on enough surfaces, a strong solid object can be made without cohesive bonding at all. FIG. 7 show a mold 29 that can make these features, according to one embodiment. The indentations 31 form the conical pieces 28 depicted in FIG. 6. The thread 30 forms the internal threads 27 in FIG. 6. In both cases, specialize movement, such as unwinding of the threads 30 is required by the machine in order to move it away from the object without damaging it. Another interlock method, not shown, is to have pins in the mold that slide into the mold area to form holes the molded part. This would be similar to the threads 30, but without the threads.

Figure 8:
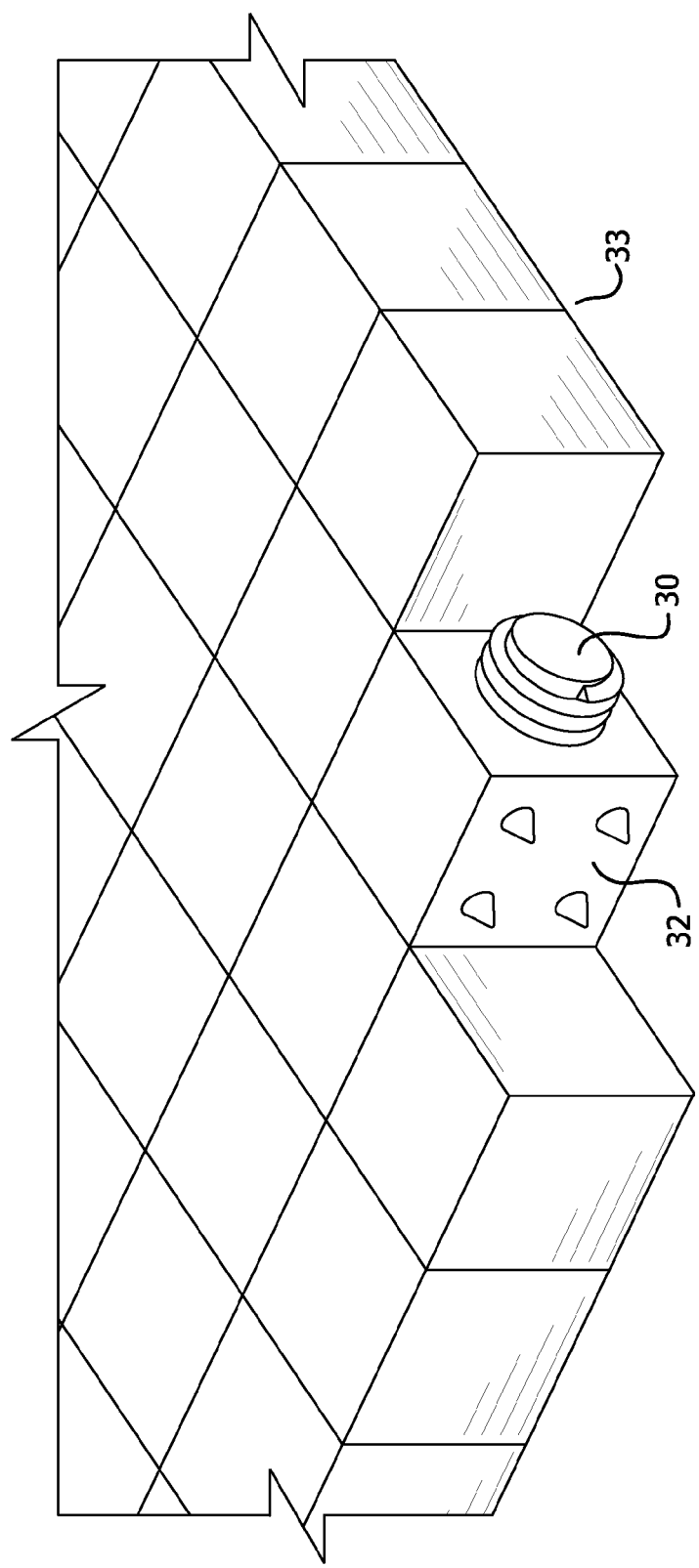
FIG. 8 is a perspective view of an object with an insert integrally molded into the object according to one embodiment of the instant invention.

FIG. 8 shows another aspect of this invention which is insert molding or over molding. An object 33 in FIG. 8 is molded in the same manner as object 25 in FIG. 6. However, instead of the threaded part 30 staying with mold 29 (as depicted in FIG. 7), the thread 30 is released and stays inside the block 32. This can be useful, for example, to have metal threads sticking out of a plastic part. This is a simplified example, and the insert molded object can be larger than any individual cube and can be made of any useful shape. For example, plastic can be additively molded around a large piece of metal for added strength.

What is claimed is:

1. A method of fabricating a three dimensional object with an additive manufacturing process comprising the steps of:
   molding a first enclosure onto a suitable support;
   injecting first material into said first enclosure;
   permitting said material to solidify;
   removing said first enclosure;
   molding a second enclosure onto said solidified material;
   injecting second material into said second enclosure;
   permitting said second material to solidify; and
   removing said second enclosures wherein the three dimensional object is created.

2. The method of claim 1 wherein machinery automatically chooses said enclosures and sequencing thereof based on a computer representation of three dimensional model of the object to be fabricated.

3. The method of claim 1 wherein the injection of material is accomplished by pressure imposed by a machine or by gravity.

4. The method of claim 1 wherein the material injected is metal, metal injection molding material, a thermoplastic, a thermoplastic composite, thermoset, a thermoset composite, or ceramic.

5. The method of claim 1 wherein the material injected is in a substantially fluid state.

6. The method of claim 1 wherein the injected material solidifies in substantially the negative of each enclosure to form a solid segment.

7. The method of claim 1 wherein a nozzle is used to assist in injection of material.

8. The method of claim 1 wherein one or more inserts are incorporated into one or more of said enclosures.

* * * * *